United States Patent
Raghavan et al.

(10) Patent No.: US 6,451,142 B1
(45) Date of Patent: Sep. 17, 2002

(54) MOUNTING PROCESS FOR OUTGASSING-SENSITIVE OPTICS

(75) Inventors: Vijaya N. V. Raghavan, Los Altos; Mark Timothy Sullivan, Mountain View; Gerald William Purmal, Los Gatos, all of CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 09/603,107

(22) Filed: Jun. 22, 2000

(51) Int. Cl.[7] ............ C08J 11/02; B32B 35/00; B29C 35/16
(52) U.S. Cl. .......... 156/80; 152/285; 152/329; 152/330; 152/286
(58) Field of Search ............ 156/80, 285, 286, 156/329, 330; 264/28

(56) References Cited

U.S. PATENT DOCUMENTS 5,311,610 A * 5/1994 Ladany et al.
5,367,006 A * 11/1994 Hermansen et al.
5,846,638 A * 12/1998 Meissner
6,157,012 A * 12/2000 Tanaka et al.

OTHER PUBLICATIONS

McKetta et al., "Encyclopedia of Chemical Processing and Design" 1983, Marcel Dekker Inc., New York, NY, vol. 19, p. 275.*

* cited by examiner

Primary Examiner—Robert Dawson
Assistant Examiner—Marc S Zimmer

(57) ABSTRACT

Optics used in a high vacuum environment are mounted by bonding by use of addition polymerizing material which used in that environment. The suitability for use in the high vacuum environment is achieved by precise control of outgassing of trapped and dissolved gases, including low molecular weight hydrocarbons and amines, and unreacted material from component parts of said addition polymerizing material. A plurality of application quantities of the polymer are prepared in a large batch for use as pre-mixed frozen (PMF) material. The use of the large batch enables more precise control of mixture so that near-stoichiometric proportions of the polymer components are easily achieved.

9 Claims, 1 Drawing Sheet

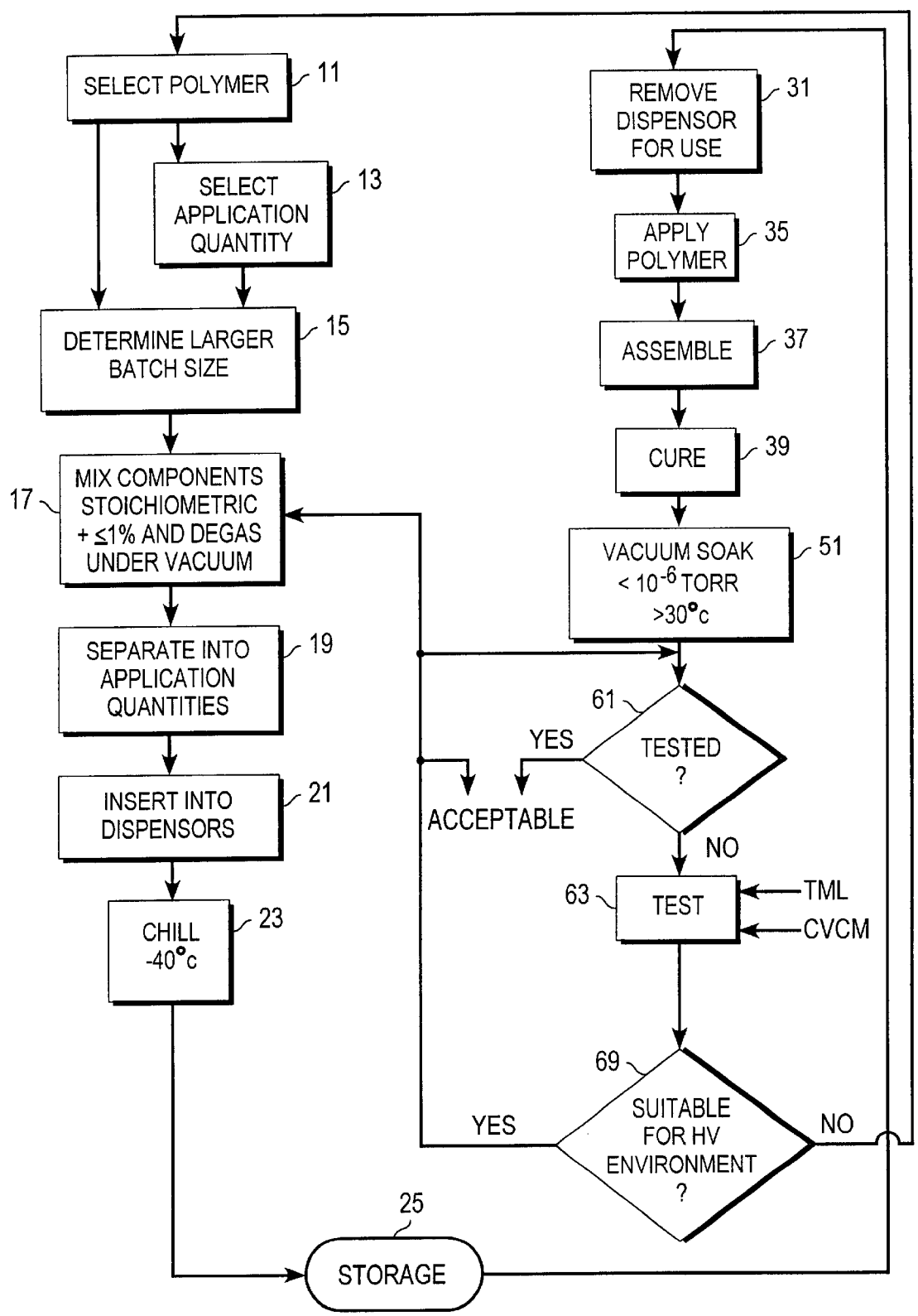
Figure

MOUNTING PROCESS FOR OUTGASSING-SENSITIVE OPTICS

FIELD OF THE INVENTION

This invention relates to addition polymerization. More particularly, the invention relates to the control of outgassing of materials formed addition polymerization. The invention has particular utility when used in a mounting process for outgassing-sensitive optics. The invention may be used for specifying and defining the vacuum quality of polymer material used in the fabrication and manufacture of interferometers.

BACKGROUND OF THE INVENTION

Successful mounting of optics has been accomplished by various mechanical methods. Of these, bonded optic mountings can usually be effected more quickly and less-expensively than traditional mechanical clamping methods. The structural adhesives most frequently used to hold optics to mounts and to bond mechanical parts together are two-part epoxies, urethanes, and room-temperature-vulcanizing (RTV) elastomers. Adhesives emit volatile ingredients during cure or if exposed to vacuum or elevated temperatures. The emitted materials may then condense as contaminating films on nearby surfaces, such as optics, opto-mechanical assemblies, or items under process.

For all high vacuum applications, cross-linked polymers are most preferred because of extremely high molecular weights generated through the chemical reaction. Such polymers do not outgas except for trace amounts of residual components or unreacted low molecular species left in the polymer network. The two most frequently used polymers are epoxies and silicones. In some instances silicones are preferred over epoxies because of their ability to perform under extreme range of temperatures; however their adhesive properties with various surfaces are not as good as the epoxies. The epoxies and silicones typically used in current fabrication processes meet the users' current needs but may not necessarily meet the outgassing requirements set by the customer future generation optic assemblies (e.g., interferometers used in high vacuum environments).

For epoxy resins, proper formulation and mixing of the resin with the amine curing agent in stoichiometric proportions is critically important to meet the outgassing requirements under vacuum conditions ranging below $10^{-6}$ torr. Commonly used amine curing agents under ambient conditions have some vapor pressure and therefore a slight excess or improper mixing would present serious problems and would not meet the vacuum compatibility and outgassing specifications for the optic assembly. To address this potential issue, some epoxy formulations use amine adducts as curing agents. This approach is ideally suited for high vacuum applications. One distinct advantage of amine adduct curing agents is that it is a product of poly-functional amines and mono-functional epoxy intermediates and have much lower volatility due to higher molecular weight. As expected, this curing agent produces a superior vacuum compatibility epoxy end product with low-outgassing performance.

One area of concern is the outgassing of the materials used for optic assemblies in a vacuum environment. Typically the outgassing species include the following:

Trapped and dissolved gases, including nitrogen, oxygen and water vapor;

Possible solvents used the cleaning process and adsorbed gases;

Low molecular weight hydrocarbons and amines that were present as impurities in the epoxy resin and the curing agent; and residual and unreacted epoxy and amine components.

When building optic assemblies, optic adhesives are typically measured and mixed as needed. Assemblers are required to dispense an exact amount of the various constituents of two-part epoxies, urethanes, or RTVs. These constituents are then mixed, often in small quantities, then applied to the optic for mounting. The problem is getting exact adhesive mixing ratios with this method. And while this method is often adequate for many standard optic applications, newer applications have very tight requirements for outgassing and contamination.

SUMMARY OF THE INVENTION

According to the present invention, outgassing of addition polymerized materials is limited by precisely controlling the admixture of the addition polymerized materials. The present invention achieves a significant reduction in the amount of material that outgasses from an optic bond. This, in turn, reduces the amounts of materials that may condense as contaminating films on critical surfaces. Specifically, by choosing different bonding agents, the amounts of total mass loss (TML) and volatile condensable materials (VCMs) can be controlled. This is accomplished by using pre-mixed and frozen (PMF) adhesives in stoichiometric proportions for optic bonding.

According to one embodiment of the present invention, PMF adhesives are used in stoichiometric proportions for optic bonding where outgassing and contamination requirements are severe. A representative application is the construction of interferometers, which are employed in high vacuum, extreme ultraviolet (EUV) lithography stages. The invention also proposes a pass criteria method for accepting or rejecting high vacuum (HV) adhesives and other materials. There are several advantages to doing this:

Stoichiometric mixtures of adhesives are consistently mixed and employed;

Assemblers do not need to mix adhesives as part of their optic assembly process;

Adhesive volatiles are outgassed in a clean room, away from critical equipment;

Optic assemblies are conditioned in a temperature-controlled, ultra-high vacuum (UHV) environment;

A pass criteria is available independent of mass, area, or specific vacuum chamber;

Candidate adhesives can be tested and measured using a standard, quantitative method; and Low-outgassing adhesives can be appropriately chosen for use in demanding HV and EUV environments minimizing risk to customer equipment.

According to the present invention, standard or custom, high-performance addition polymerizing adhesives are used in relatively large batches and the components of the adhesives are pre-mixed in the large batches. The batches are then packaged in desired quantities for storage until use. By using larger quantities, constituent measurement errors are minimized. By way of example, a 1 gram error has much less effect on a 1000 gram batch than a 10 gram batch. Reducing measurement errors has been shown to reduce the amounts of unwanted outgassing constituents, which typically include hydrocarbons, plasticizers, and silicones. The desired quantities are then dispensed into convenient packages (e.g., 5 cubic centimeter syringes). To keep the premixed adhesives from curing, the containers are frozen at temperatures ranging from −40 to −80° C. They are preferably kept at this temperature until ready for use.

DESCRIPTION OF THE DRAWING

The drawing FIGURE is a flow chart of an addition polymer procedure according to the present invention.

DETAILED DESCRIPTION OF THE INVENTION

Referring to the drawing FIGURE, there is depicted a flow chart of an addition polymer preparation procedure used according to the present invention. An addition polymerizing polymer is selected 11 and an application quantity is selected 13. A larger batch size is determined 15 based on the selected polymer 11 and selected application quantity 13. Components of the addition polymerizing polymer are mixed 17 in stoichiometric quantities. The desired precision of scoichiometric mixing is used to adapt the larger batch size to the mixing process. This effectively optimizes the batch size according to difficulty in achieving stoichiometric mixing to a desired precision. The stoichiometric mixing is performed to within predetermined limits calculated to limit outgasing to acceptable levels. Typically this mixing is to less than ±1% of stoichiometric. The batch is then separated 19 into application quantities and inserted 21 into dispensers, such as syringes, tubes or jars. The dispensers are then chilled sufficiently to retard polymerization for a predetemined shelf life, and retained for storage 25. Typically such chilling is performed to −80° C., although it is possible to use higher temperatures. For a typical polymer, chilling to −40° C. provides a two or three month shelf life and chilling to 0° C. provides a shelf life of approximately one day.

After storage 25 an application quantity of the polymerizing material is retrieved 31 and applied 35 to the parts for bonding 37, 39. The assembled parts are cured and outgassed 51 in order to outgas remaining volitile components and byproducts. After outgassing 51, if no specific test data is available 61, the assembled components are tested 63 by performing total material loss (TML) and collected volatile condensable materials (CVCM) tests. These tests are performed subsequent to said outgassing for a given combination of polymer and configuration in the outgassing-sensitive environment. If the process as applied to the particular polymer and assembly is deemed satisfactory 69, then the procedure is qualified; otherwise a different mixture of addition polymerizing materials is selected or other changes are made to the procedure.

For an optic assembly to be built for use in a HV environment, its piece parts must be properly prepared. This involves special fabrication, cleaning, and packaging operations. To assemble a HV optic assembly, an assembler typically collects the prepared parts, along with the adhesives required to assemble them. By using pre-mixed and frozen (PMF) adhesives, the assembler simply goes to the low-temperature freezer and withdraws the number of syringes needed for the current assembly work. The HV optic assembly process then takes place, but without the need for mixing the required adhesives. Once the assembly is complete and proper alignment assured, the assembly is left to cure for a period of time (typically one week). This cure time allows the adhesives to evolve volatiles that are a normal part of the curing process. These volatiles outgas from the optic assembly in a production clean room, rather than in a precision optic environment.

The completed optic assemblies can also be further conditioned in a HV environment, such as <$10^{-6}$ torr. This vacuum environment, along with some optional heating at 30–40° C. for an extended period of time such as 5 to 7 days, further increases the outgassing mechanism for the adhesives and other parts of optic assemblies. Once the measured rates of outgassing are below a specified pass criteria, the HV optic assembly is deemed suitable for use in an outgassing-sensitive environment. An example of equipment used in an outgassing-sensitive environment would be an extreme ultraviolet (EUV) lithography machine.

According to one embodiment of the present invention, pass criteria for outgassing are based on concepts and terminology defined in ASTM E 1559-93, Standard Test Method for Contamination Outgassing Characteristics of Spacecraft Materials. For every candidate HV adhesive, total mass loss and volatile condensable materials are measured on a mass per unit area basis (e.g., microgram/square centimeter, $mg/cm^2$) and a mass percentage basis (e.g., microgram/gram, mg/g). The outgassing rate is measured on a mass per unit area per unit time basis (e.g., picogram/square centimeter-second, $pg/cm^2$-s), as well as a mass percentage per unit time basis (e.g., picogram/gram-second, pg/g-s).

The ASTM E 1559 method typically uses four quartz crystal microbalances (QCMs) to collect material evolved from materials under test. Test results usually are given in the following categories:

1. Total Mass Loss (TML);
2. Very-high Volatility Condensable Materials (materials <50 atomic mass units (amu));
3. High Volatility Condensable Materials (materials 50–200 amu);
4. Medium Volatility Condensable Materials (materials 200–400 amu);
5. Low Volatility Condensable Materials (materials >400 amu); and
6. Final Outgassing Rate.

TML and final outgassing rate (FOG) are relatively straightforward measured quantities. This is accomplished by operating the QCMs at different temperatures where different species will condense (typically 80 K, 160 K, 220 K, and 298 K). The VCMs are measured in amu bands. Atmospheric gases with <50 amu, such as $H_2$, $H_2O$, $N_2$, CO, $O_2$, $CO_2$ are considered to be harmless to equipment and processes. The VCMs with >50 amu will be grouped together for purposes of this pass criterion. If the high, medium, and low VCM quantities are summed (either $mg/cm^2$ or mg/g), the amounts long-chain molecules, such as hydrocarbons, plasticizers, and silicones, can be bracketed. This measurement, defined as high, medium, & low (HML) VCMs, along with TML and FOG rate can indicate:

how much material an adhesive will lose (TML);
what the constituents of the mass loss will be (i.e., harmless atmospheric gases or problematic long-chain polymers; HML VCMS); and
how much material come from the adhesive as the outgassing rate tends towards an asymptote (FOG).

These quantities are used for determining whether an adhesive is appropriate in an outgassing-sensitive environment. There are three principal advantages of this pass criteria method:

1. outgassing results are independent of mass or area;
2. because outgassing results are independent of mass or area, materials, parts, and assemblies can be tested using the same method; and 3. the pass criteria is based on an ASTM standard vacuum chamber configuration, allowing different organizations to compare results.

The PMF bonding technique, together with the pass criteria, brings quantifiable and repeatable methods to critical optic applications. This allows properly prepared optic assemblies to be used in outgassing-sensitive environments without damaging other optic assemblies or items in process.

For high vacuum measuring and testing applications, cross-linked polymers are preferred because of extremely high molecular weight generated through the chemical reaction. As a result of the high molecular weight, these polymers do not outgas except for trace amounts of residual components or unreacted low molecular species left in the polymer network. The two most frequently used polymers in such applications are epoxies and silicones. In some instances silicones are preferred over epoxies because of their ability to perform under extreme range of temperatures; however, their adhesive properties various surfaces are not as good as the epoxies. The epoxies and silicones used in the PMC (polymer matrix composite) fabrication process meet the user's current needs but may not necessarily meet the outgassing requirements which may be established for future generation interferometers.

NASA document, *Outgassing Data for Selecting Spacecraft Materials*, describes criteria for materials. This criteria is useful in selecting and evaluating vacuum compatible polymeric materials for interferometer applications in which the materials are held in a vacuum environment. The document citation is, *Outgassing Data for Selecting Spacecraft Materials*, William A. Campbell, Jr. and John J. Scialdone, September, 1993, Performing Organization Report Number 93E02432; Sponsoring/Mentoring Agency Report Number NASA RP-1124, Revision 3, National Aeronautics and Space Administration Goddard Space Flight Center, Greenbelt, Md. 20771.

For epoxy resins, proper formulation and mixing of the resin with an amine curing agent in stoichiometric proportions is critically important in order to meet the outgassing requirements under vacuum conditions ranging below $10^{-6}$ torr. Commonly used amine curing agents under ambient conditions have some vapor pressure and therefore a slight excess or improper mixing would present serious problem and would not meet the vacuum compatibility and outgassing specifications for the optical tool. To address this potential issue some epoxy formulations use amine adducts as curing agents and is approach is ideally suited for high vacuum applications. One distinct advantage of amine adduct curing agents is that they are a product of polyfunctional amines and monofunctional epoxy intermediates and have much lower volatility due to higher molecular weight. Such curing agents produce a superior vacuum compatibility epoxy end product with low outgassing properties. In order to meet and exceed vacuum compatibility specifications it is desired that epoxy resins, curing agents and outgassing of the final assembly part be manufactured with the following techniques:

Use premixed epoxies in stoichiometric proportions and frozen to 40° C. The shelf life for most such premixed epoxies at this temperature is about 6 months. Premixed epoxies are costly but premixing helps to eliminate process variation between batches.

Select an epoxy formulation that uses amine adduct as a curing agent and the meets this criteria is EPK1C (repackaged under Torrscal/Varian), Dexter Polymer Corporation. This can be a replacement for grey epoxy EPK 907. For EPK1C TML is 0.81% and collected volatile condensable materials (CVCM) is 0.02%.

Use an epoxy that is premixed and frozen (PMF) that are vacuum compatible and meets NASA outgassing specifications. Master Bond sells several PMF epoxies that are vacuum compatible and meets NASA outgassing specifications. These come with different viscosity and cure times and certain formulations meet the NASA outgassing specifications.

A significant criteria is to limit outgassing of the materials used in the assembly process in a vacuum environment. Typically the outgassing species include the following:

Trapped and dissolved gases including nitrogen,oxygen and water vapor;

Possible solvents used the cleaning process and adsorbed gases;

Low molecular weight hydrocarbons and amines that were present as impurities in the epoxy resin and the curing agent; and residual and unreacted epoxy and amine components; this should not occur if premixed and frozen (PMF) components are used.

Volatile components can be removed by vacuum baking $10^{-6}$ to $10^{-6}$ torr at temperature range between 30 to 40° C. over an extended period of time i.e., 5–7 days. This can be verified by monitoring the outgassing species with a GC/MS or MS (without the GC). GC/MS is a very valuable tool for monitoring, evaluating and qualifying the individual elements or the assembly unit for vacuum compatibility and outgassing selection criteria. A suitable GC/MS system can be purchased from Agilent California Analytical Systems Group. Such monitoring can be used in the establishment of threshold levels for outgassing for the materials used in the process.

In addition repeated evacuation and backfilling with dry nitrogen can also remove volatile components, and this method will help to flush out volatile impurities very effectively. A detailed procedure for the outgassing of the parts and final qualification can be developed utilizing dry nitrogen.

The silicone Dow Corning 6-1104 generates methanol as byproduct of the curing process. This silicone may take several days or weeks to completely outgas through a sandwiched interface between the glass and metal elements. As a result this may not be an ideal candidate for the present specification of vacuum compatibility materials. An alternative polymer Dow Corning 93-500 space grade encapsulant has better outgassing performance characteristics. This is a two-part system and the curing is achieved by vinyl polymerization. Therefore no volatile components are produced in the curing processes. This can also be obtained premixed and frozen (PMF) to achieve optimum results. TML is 0.25% and collected volatile condensable materials (CVCM) is 0.05%.

Cleanroom and handling procedures are as follows:

Clean and assemble the parts in a class 100 environment or better;

Use powder free antistatic clean room gloves. Never touch parts or surfaces with bare hands;

Follow all the cleanroom protocol procedure i.e., bunny suits, facemasks, etc.

Certain materials are considered forbidden materials in a high vacuum environment. One such polymer is a type of silicone polymer. Despite this, some silicone polymers, such as Dow Corning 93-500 silicone may be used in some circumstances. Proper application of silicon polymers is critical, and silicone, if improperly applied will result in volatile components from the silicone being deposited on the optics as $SiO_2$/polymer film, thereby degrading optical properties.

One area of concern are incompatible outgassing components in the assembly unit, where specifications have become more critical. Outgassing components from the epoxies must not interact with silicone, optical cements or metals used in the assembly process. This may occur over a period of several months of operation of an interferometer in a vacuum environment. Therefore the interaction and chemistry of each outgassing component must be understood and eliminated if necessary.

Several moisture and vapor barrier packaging materials are available from Baystat, of Menlo Park, Calif. Preconditioning of the bags in a vacuum environment is suggested before it is used to package the tool. Other resources are Assyst SMIF boxes for transporting the tool.

For cured polymers, it is desired to perform TML and CVCM tests after outgassing is performed for 5 to 7 days. During this period the polymer will continue to cure and at the same time outgassing is taking place. A baseline GC/MS database is established for all components used the vacuum interferometer as tool for process control.

What is claimed is:

1. Method for selecting and providing polymers for use in outgassing-sensitive environments, the method comprising:
   selecting a suitable addition polymerizing material that includes a silicone polymer which achieves curing by vinyl polymerization;
   determining a quantity of said material for a single application;
   mixing a quantity of said selected material in a batch of at least four times the quantity for the single application, said mixing resulting in combining component parts of said addition polymerizing material for polymerization, whereby said mixing is provided at stoichiometric proportions within 2% by weight;
   subdividing the batch into single application quantities;
   placing a plurality of the application quantities in a chilled environment with a temperature between 0° to –80° C., such that polymerization is retarded sufficiently for anticipated future use of the plurality of said application quantities as pre-mixed frozen (PMF) material; and
   providing individual ones of the application quantities for use in the outgassing-sensitive environments, thereby permitting cold storage of unused application quantities retained for future use while providing said individual ones of the application quantities for use as desired.

2. Method for selecting and providing polymers for use in outgassing-sensitive environments, the method comprising:
   selecting a suitable addition polymerizing material;
   determining a quantity of said material for a single application;
   mixing a quantity of said selected material in a batch of at least four times the quantity for the single application, said mixing resulting in combining component parts of said addition polymerizing material for polymerization, whereby said mixing is provided at stoichiometric proportions within 2% by weight;
   subdividing the batch into single application quantities;
   placing a plurality of the application quantities in a chilled environment with a temperature between 0° C. to –80° C., such that polymerization is retarded sufficiently for anticipated future use of the plurality of said application quantities as pre-mixed frozen (PMF) material;
   providing individual ones of the application quantities for use in the outgassing-sensitive environments, thereby permitting cold storage of unused application quantities retained for future use while providing said individual ones of the application quantities for use as desired;
   applying one of said individual quantities in assembling components for use in an outgassing-sensitive environment;
   outgassing the assembled components for at least one day in a high vacuum environment of pressure lower than $10^{-6}$ torr and at least 30° C., said outgassing depleting trapped and dissolved gases, including nitrogen, oxygen and water, solvents, if any, used during cleaning processes, low molecular weight hydrocarbons and amines from the component parts of said addition polymerizing material, and residual and unreacted material from said component parts of said addition polymerizing material.

3. Method for assembling optics, the method comprising:
   selecting an addition polymerizing polymer suitable for use in an outgassing-sensitive environment;
   determining a quantity of said material for a single application;
   mixing a quantity of said selected material in a batch of at least four times the quantity for the single application, said mixing resulting in combining component parts of said addition polymerizing material for polymerization, whereby said mixing is provided at stoichiometric proportions within 2% by weight;
   subdividing the batch into single application quantities;
   placing a plurality of the application quantities in a chilled environment with a temperature between 0° C. to –80° C., such that polymerization is retarded sufficiently for anticipated future use of the plurality of said application quantities as pre-mixed frozen (PMF) material;
   providing individual ones of the application quantities for use in the outgassing-sensitive environments, thereby permitting cold storage of unused application quantities retained for future use while providing said individual ones of the application quantities for use as desired;
   assembling at least one component of the optics by bonding with said PMF material;
   applying one of said individual quantities, when ready for use, to at least one component of the optics to be assembled for use in an outgassing-sensitive environment;
   outgassing the assembled components for at least one day; and
   performing total material loss (TML) and collected volatile condensable materials (CVCM) tests subsequent to said outgassing, said TML and CVCM tests performed at least once for a given combination of polymer and configuration in the outgassing-sensitive environment.

4. Method for assembling optics, the method comprising:
   selecting an addition polymerizing polymer suitable for use in an outgassing-sensitive environment;
   determining a quantity of said material for a single application;
   mixing a quantity of said selected material in a batch of at least four times the quantity for the single application, said mixing resulting in combining component parts of said addition polymerizing material for polymerization, whereby said mixing is provided at stoichiometric proportions within 2% by weight;

subdividing the batch into single application quantities;

placing a plurality of the application quantities in a chilled environment with a temperature between 0° C. to −80° C., such that polymerization is retarded sufficiently for anticipated future use of the plurality of said application quantities as pre-mixed frozen (PMF) material;

providing individual ones of the application quantities for use in the outgassing-sensitive environments, thereby permitting cold storage of unused application quantities retained for future use while providing said individual ones of the application quantities for use as desired;

assembling at least one component of the optics by bonding with said PMF material; and outgassing the assembled components to deplete trapped and dissolved gases, including:
nitrogen, oxygen and water,
solvents, if any, used during cleaning processes,
low molecular weight hydrocarbons and amines from the component parts of said addition polymerizing material, and
residual and unreacted material from said component parts of said addition polymerizing material.

5. Method for assembling optics, the method comprising:

selecting an addition polymerizing polymer suitable for use in an outgassing-sensitive environment, wherein the addition polymerizing material includes a silicone polymer which achieves curing by vinyl polymerization;

determining a quantity of said material for a single application;

mixing a quantity of said selected material in a batch of at least four times the quantity for the single application, said mixing resulting in combining component parts of said addition polymerizing material for polymerization, whereby said mixing is provided at stoichiometric proportions within 2% by weight;

subdividing the batch into single application quantities;

placing a plurality of the application quantities in a chilled environment with a temperature between 0° C. to −80° C., such that polymerization is retarded sufficiently for anticipated future use of the plurality of said application quantities as pre-mixed frozen (PMF) material;

providing individual ones of the application quantities for use in the outgassing-sensitive environments, thereby permitting cold storage of unused application quantities retained for future use while providing said individual ones of the application quantities for use as desired; and assembling at least one component of the optics by bonding with said PMF material.

6. Method as described in claim 3, further comprising:
using data from said TML and CVCM tests to verify the polymers are suitable for use in the given configuration in an outgassing-sensitive environment.

7. Method as described in claim 3, wherein the outgassing is performed in a high vacuum environment of pressure lower than $10^{-6}$ torr.

8. Method as described in claim 7, wherein the outgassing is performed at a temperature of at least 30° C.

9. Method as described in claim 8, wherein the outgassing depletes trapped and dissolved gases, including nitrogen, oxygen and water, solvents, if any, used during cleaning processes, low molecular weight hydrocarbons and amines from the component parts of said addition polymerizing material, and residual and unreacted material from said component parts of said addition polymerizing material.

* * * * *